(12) United States Patent
Kitamura et al.

(10) Patent No.: US 8,803,433 B2
(45) Date of Patent: Aug. 12, 2014

(54) LIGHTING POWER SOURCE AND LUMINAIRE

(75) Inventors: Noriyuki Kitamura, Kanagawa-ken (JP); Yuji Takahashi, Kanagawa-ken (JP); Hirokazu Otake, Kanagawa-ken (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 110 days.

(21) Appl. No.: 13/608,460

(22) Filed: Sep. 10, 2012

(65) Prior Publication Data

US 2013/0119879 A1     May 16, 2013

(30) Foreign Application Priority Data

Nov. 10, 2011   (JP) .................................. 2011-246592

(51) Int. Cl.
*H05B 37/00*     (2006.01)

(52) U.S. Cl.
USPC ...................................... 315/200 R; 315/291

(58) Field of Classification Search
None
See application file for complete search history.

(56) References Cited

U.S. PATENT DOCUMENTS

| | | | | |
|---|---|---|---|---|
| 4,482,844 A | * | 11/1984 | Schweer et al. ............... | 315/194 |
| 4,593,232 A | * | 6/1986 | McEdwards .................. | 315/199 |
| 4,959,591 A | * | 9/1990 | Hirschmann ............. | 315/209 R |
| 5,170,099 A | * | 12/1992 | Ueoka et al. .................. | 315/291 |
| 5,365,148 A | * | 11/1994 | Mallon et al. .................. | 315/194 |
| 5,404,080 A | * | 4/1995 | Quazi ........................... | 315/151 |
| 5,455,490 A | * | 10/1995 | Callahan et al. ............... | 315/194 |
| 5,525,870 A | * | 6/1996 | Matsuzawa et al. ...... | 315/209 R |
| 6,002,215 A | * | 12/1999 | Yamashita et al. ............. | 315/308 |
| 6,034,487 A | * | 3/2000 | Yamashita et al. ............. | 315/244 |
| 2006/0138973 A1 | * | 6/2006 | Hirosawa ....................... | 315/291 |
| 2008/0129220 A1 | * | 6/2008 | Shteynberg et al. ........... | 315/291 |
| 2009/0001898 A1 | * | 1/2009 | Otsuki et al. ................ | 315/169.4 |
| 2010/0013398 A1 | * | 1/2010 | Matsuzaki et al. ............. | 315/219 |
| 2010/0164392 A1 | * | 7/2010 | Ashikaga ....................... | 315/246 |
| 2011/0140629 A1 | | 6/2011 | Lei et al. | |
| 2011/0193488 A1 | | 8/2011 | Kanamori et al. | |
| 2013/0119879 A1 | * | 5/2013 | Kitamura et al. ......... | 315/200 R |

FOREIGN PATENT DOCUMENTS

| | | |
|---|---|---|
| JP | 2011-119237 | 6/2011 |
| WO | 2011/008635 A1 | 1/2011 |

OTHER PUBLICATIONS

European Search Report issued in corresponding European Application No. 12183728.0-1802 dated Mar. 28, 2013.

* cited by examiner

*Primary Examiner* — Crystal L Hammond
(74) *Attorney, Agent, or Firm* — Banner & Witcoff, Ltd.

(57) ABSTRACT

A lighting power source according to an embodiment includes a rectifying circuit, a smoothing capacitor, a reference voltage generating circuit, and a DC-DC converter. The rectifying circuit rectifies an AD voltage input thereto. The smoothing capacitor smoothes an output from the rectifying circuit. The reference voltage generating circuit generates a reference voltage on the basis of at least any one of an output voltage of the rectifying circuit and a voltage from the smoothing capacitor. The DC-DC converter includes an output element and a constant current element, and converts the voltage of the smoothing capacitor. The output element receives a supply of a voltage of the smoothing capacitor, oscillates by performing a switching operation which repeats an ON state and an OFF state when the reference voltage is relatively high, and continues the ON state when the reference voltage is relatively low.

20 Claims, 6 Drawing Sheets

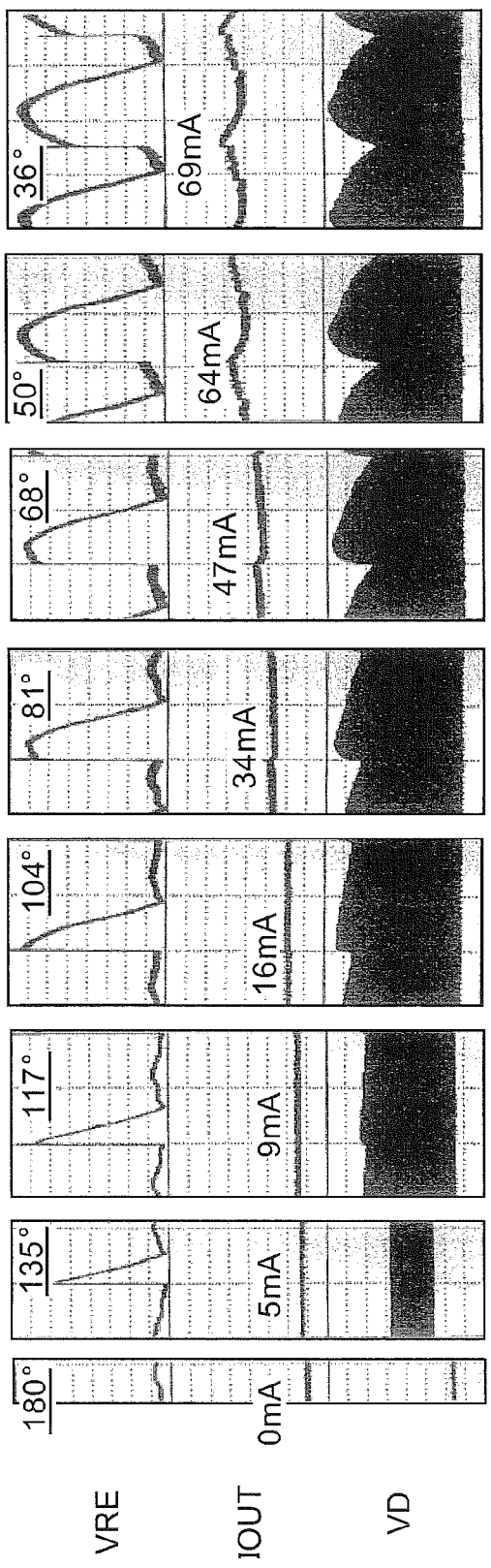

LIGHTING POWER SOURCE AND LUMINAIRE

CROSS-REFERENCE TO RELATED APPLICATIONS

This application is based upon and claims the benefit of priority from the prior Japanese Patent Application No. 2011-246592, filed on Nov. 10, 2011; the entire contents of which are incorporated herein by reference.

FIELD

Embodiments described herein relate to a lighting power source and a luminaire.

BACKGROUND

In recent years, replacement of lighting sources from incandescent lamps or fluorescent lamps to energy saving and long life light sources such as light-emitting diodes (LED) in luminaires is in progress. Also, for example, new lighting sources such as Electro-Luminescence (EL) or Organic light-emitting diode (OLED) are also developed. Since light outputs from such lighting sources depend on current values flowing therethrough, a power circuit configured to supply a constant current is required when lighting the luminaire. When dimming light, a current to be supplied is controlled.

A two-wire dimmer is configured to control the phase which turns triac ON, and is in widespread use as a dimmer of the incandescent lamp. Therefore, the lighting source such as the LED is preferably dimmed by the dimmer. A switching power source such as a DC-DC converter is known as a power source having high efficiency and being suitable for electric power saving and downsizing.

However, the dimmer is configured to be operated by being connected in series with a filament of the incandescent lamp as a load, and when the switching power source is connected, a load impedance may vary and hence malfunction may be resulted.

DESCRIPTION OF THE DRAWINGS

FIGS. 5A to 5H are waveform charts illustrating principal signals of the lighting power source;

DETAILED DESCRIPTION

Figure 1:
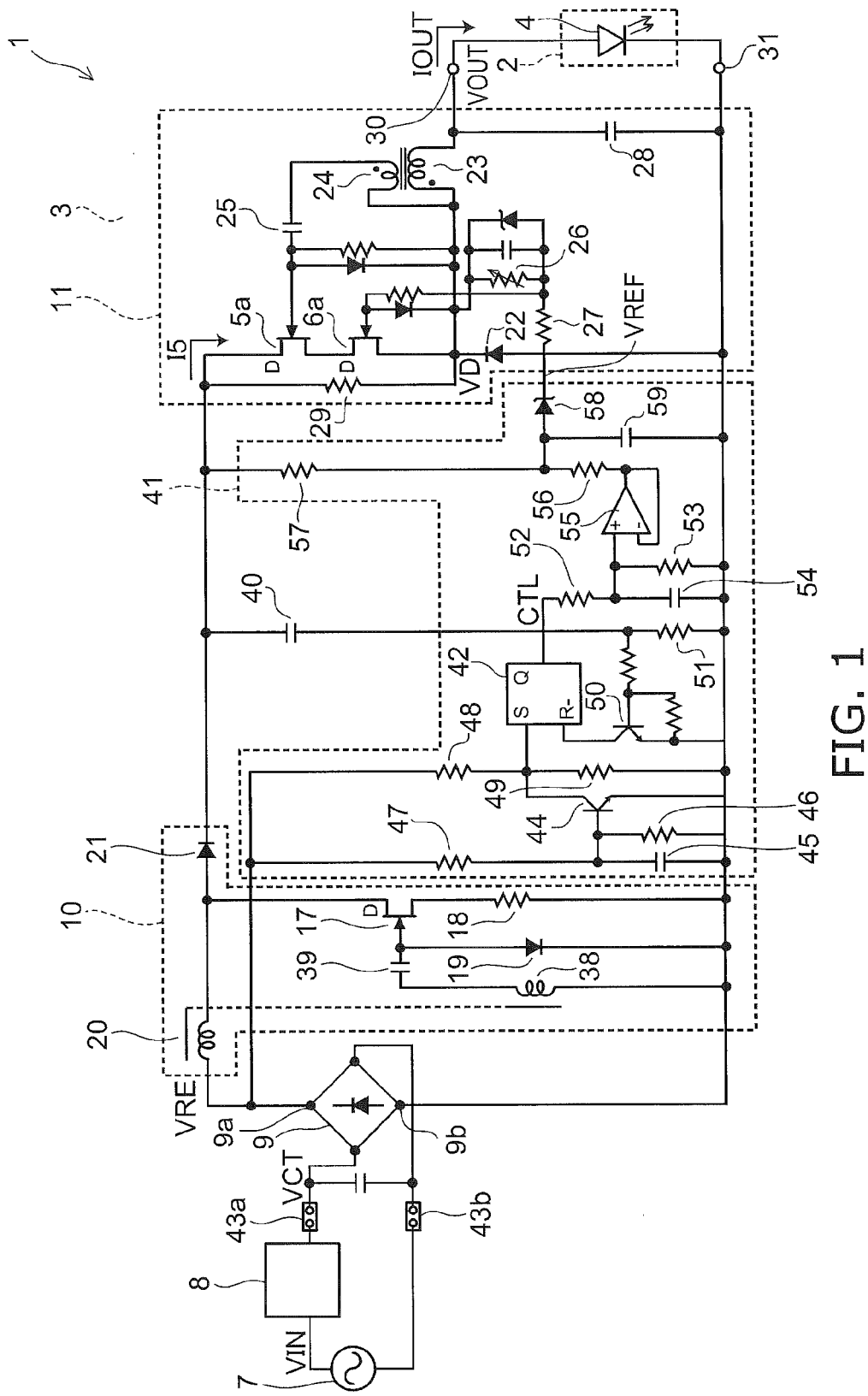
FIG. 1 is a circuit diagram illustrating a luminaire including a lighting power source according to a first embodiment.

In general, according to one embodiment, a lighting power source includes a rectifying circuit, a smoothing capacitor, a reference voltage generating circuit, and a DC-DC converter. The rectifying circuit rectifies an AD voltage input thereto. The smoothing capacitor smoothes an output from the rectifying circuit. The reference voltage generating circuit generates a reference voltage on the basis of at least any one of an output voltage of the rectifying circuit and a voltage from the smoothing capacitor. The DC-DC converter includes an output element and a constant current element, and converts the voltage of the smoothing capacitor. The output element receives a supply of voltage of the smoothing capacitor, oscillates by performing a switching operation which repeats an ON state and an OFF state when the reference voltage is relatively high, and continues the ON state when the reference voltage is relatively low. The constant-current element is connected to the output element in series, and passes a constant current controlled by the reference voltage.

Referring now to the drawings, examples will be described in detail. In this specification of the application and respective drawings, the same components as those described relating to already presented drawing are designated by the same reference numerals and detailed description will be omitted as needed. A logical value true ("1") is expressed as a high level, and a logical value false ("0") is expressed as a low level.

A first embodiment will be described first.

FIG. 1 is a circuit diagram illustrating a luminaire including a lighting power source according to the first embodiment.

As illustrated in FIG. 1, a luminaire 1 includes a lighting load 2, and a lighting power source 3 configured to supply power to the lighting load 2.

The lighting load 2 includes a lighting source 4 such as an LED, and is turned ON by receiving a supply of an output voltage VOUT and an output current IOUT from the lighting power source 3. The lighting load 2 is capable of dimming light by varying at least one of the output voltage VOUT and the output current IOUT. The values of the output voltage VOUT and the output current IOUT are defined in accordance with the lighting sources.

Figure 2:
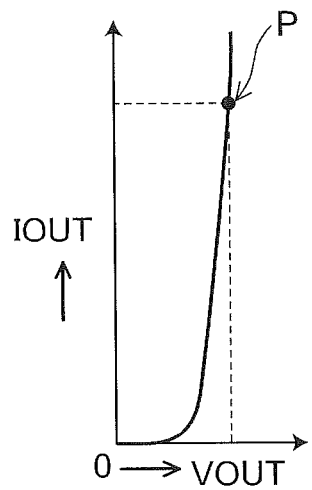
FIG. 2 is a characteristic drawing illustrating a relationship between an output voltage VOUT and an output current IOUT supplied to a lighting load.

FIG. 2 is a characteristic drawing illustrating a relationship between the output voltage VOUT and the output current IOUT supplied to a lighting load.

In FIG. 2, for example, a characteristic of the lighting load including a lighting source having a small operating resistance when turned ON, such as the LED is exemplified.

The lighting load 2 is turned OFF without a current flowing therethrough when the output voltage VOUT is lower than a predetermined voltage. When the output voltage VOUT is equal to or higher than the predetermined voltage, the current flows therethrough and is turned ON.

For example, when the lighting source 4 is an LED, the predetermined voltage is a forward voltage of the LED, and is defined in accordance with the lighting source 4. The lighting source 4 has a low operating resistance when turned ON, and the variation of the output voltage VOUT is small even when the output current IOUT is increased in the vicinity of a rated operating point P, for example. Therefore, the lighting load 2 of the characteristic as illustrated in FIG. 2 is capable of dimming light by controlling the light output of the lighting source 4 by varying the output current IOUT. When the output voltage VOUT is lowered to a voltage lower than the output voltage VOUT, the lighting source 4 is turned OFF and the output current TOUT does not flow. Therefore, when the output voltage VOUT is smoothed by a capacitor and output therefrom, the value of the output voltage VOUT is maintained at the predetermined voltage.

The lighting power source 3 includes a dimmer 8, a rectifying circuit 9, a power factor control circuit 10, a DC-DC converter 11, a smoothing capacitor 40, and a reference voltage generating circuit 41. An AC power source 7 is, for example, a commercial power source.

The dimmer 8 is connected to the AC power source 7, and is inserted into one of a pair of power lines configured to supply power voltage VIN in series. The dimmer 8 may be inserted into the pair of power lines configured to supply the power voltage VIN in series.

Figure 3:
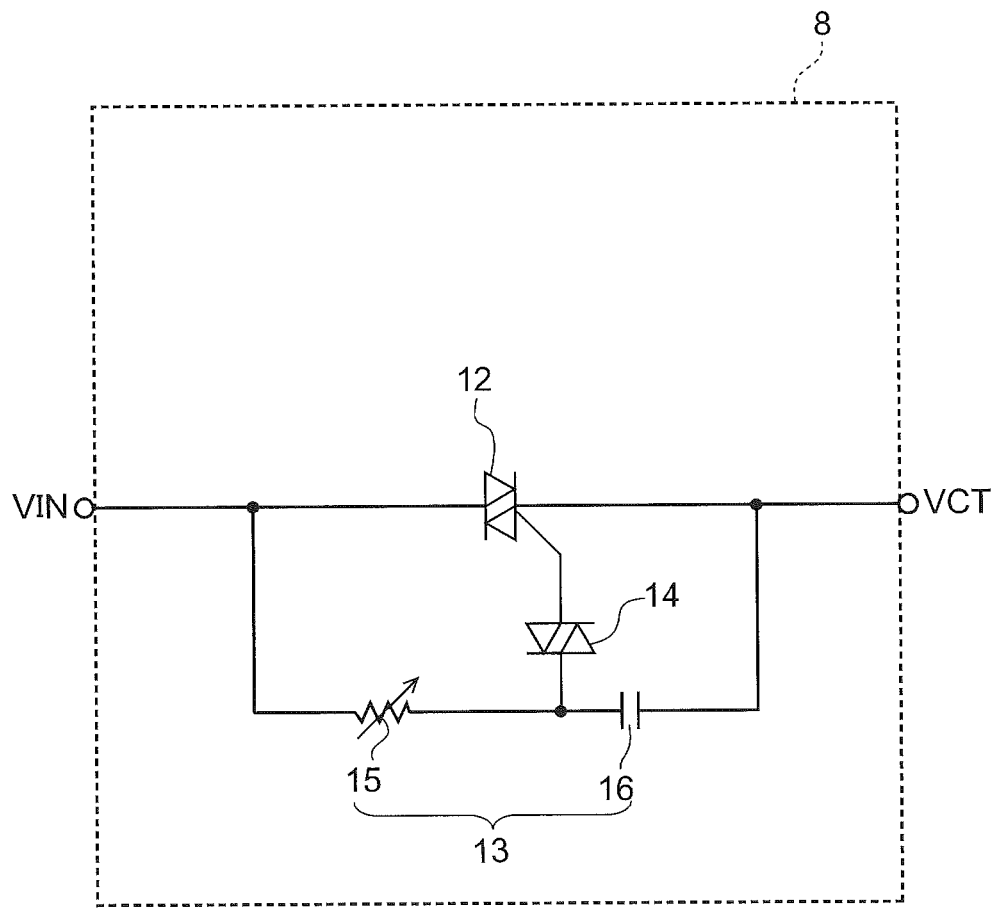
FIG. 3 is a circuit diagram, illustrating a dimmer.

FIG. 3 is a circuit diagram illustrating a dimmer. As illustrated in FIG. 3, the dimmer 8 is a two-wire phased control dimmer.

The dimmer 8 includes a triac 12 inserted into the power line in series, a phase circuit 13 connected in parallel to the triac 12, and a diac 14 connected between a gate of the triac 12 and the phase circuit 13.

The triac 12 is normally in OFF state and is turned ON when a pulse signal is input to the gate. The triac 12 is capable of allowing a current to flow in both directions when the alternating power voltage VIN has either a positive polarity or a negative polarity.

The phase circuit 13 includes a variable resistance 15 and a capacitor 16, and generates a voltage at both ends of the capacitor 16 delayed in phase. When the value resistance of the variable resistance 15 is varied, a time constant varies and a delay time varies.

The diac 14 generates a pulse voltage when the voltage to be charged in the capacitor of the phase circuit 13 exceeds a certain value, and turns ON the triac 12.

The dimmer 8 is capable of adjusting timing when the triac 12 is turned ON by controlling the timing when the diac 14 generates pulses by varying the time constant of the phase circuit 13. The dimmer 8 outputs an AC voltage VCT which varies in timing of conduction depending on the dimming degree.

Returning to FIG. 1 again, the rectifying circuit 9 rectifies the AC voltage VCT controlled in timing of conduction by the dimmer 8 and outputs a DC voltage (pulsed flow voltage) VRE. The rectifying circuit 9 outputs the DC voltage VRE which varies in timing of conduction, that is, phase at which the voltage is increased in accordance with the dimming degree of the dimmer 8. The rectifying circuit 9 is composed of a diode bridge, and outputs the DC voltage VRE between a high-potential terminal 9a and a low-potential terminal 9b. The rectifying circuit 9 may have any suitable configuration as long as the AC voltage input from the dimmer 8 is rectified. A capacitor which reduces a noise generated by the DC-DC converter is connected to an input side of the rectifying circuit 9.

The power factor control circuit 10 includes a switching element 17, a resistance 18, diodes 19 and 21, a choke coil 20, a drive winding 38 magnetically coupled to the choke coil 20, and a capacitor 39.

The switching element 17 is, for example, an FET, and is a normally-on type element. A drain of the switching element 17 is connected to the high-potential terminal 9a of the rectifying circuit 9 via the choke coil 20, and a source of the switching element 17 is connected to the low-potential terminal 9b of the rectifying circuit 9 via the resistance 18. The gate of the switching element 17 is connected to one end of the drive winding 38 via the capacitor 39. The other end of the drive winding 38 is connected, to the low-potential terminal 9b of the rectifying circuit 9.

The drive winding 38 is connected to the gate of the switching element 17 at a polarity which supplies a voltage having a positive polarity to the source when a current increasing in the direction from the high-potential terminal 9a to the drain of the switching element 17 flows through the choice coil 20. The protecting diode 19 is also connected to the gate of the switching element 17.

An anode of the diode 21 is connected to the high-potential terminal 9a of the rectifying circuit 9 via the choke coil 20, and a cathode of the diode 21 is connected to the DC-DC converter 11 and the smoothing capacitor 40.

One end of the smoothing capacitor 40 is connected to the cathode of the diode 21 of the power factor control circuit 10, and the other end of the smoothing capacitor 40 is connected to the low-potential terminal 9b of the rectifying circuit 9 via a resistance 51 of a reference voltage generating circuit 41. The resistance 51 is a resistance configured to detect a charging current of the smoothing capacitor 40, and is set to a sufficiently small value of resistance with respect to an impedance of the smoothing capacitor 40.

The DC-DC converter 11 includes an output element 5a, a constant current element 6a, a rectifying element 22, an inductor 23, a feedback winding 24 magnetically coupled to the inductor 23, a coupling capacitor 25, dividing resistances 26 and 27, an output capacitor 28, and a bias resistance 29.

The output element 5a and the constant current element 6a are, for example, field-effect transistors (FET), for example, high-electron-mobility transistors (HEMT), and are the normally-on type elements.

A drain of the output element 5a is connected to the cathode of the diode 21 of the power factor control circuit 10. A source of the resistance 5a is connected to a drain of the constant current element 6a, and a gate of the output element 5a is connected to one end of the feedback winding 24 via the coupling capacitor 25.

A source of the constant current element 6a is connected to one end of the inductor 23 and the other end of the feedback winding 24, and a voltage obtained by dividing a source potential of the constant current element 6a and a reference voltage VREF output from the reference voltage generating circuit 41 by the dividing resistances 26 and 27 is input to a gate of the constant current element 6a.

The bias resistance 29 is connected between the drain of the output element 5a and the source of the constant current element 6a, and supplies a DC voltage to the dividing resistances 26 and 27. Consequently, a potential lower than the source is supplied to the gate of the constant current element 6a. The inductor 23 and the feedback winding 24 are magnetically coupled at a polarity which supplies a voltage of a positive polarity to the gate of the output element 5a when an increasing current flows from one end to the other end of the inductor 23. Protective diodes are connected respectively to the gate of the output element 5a and the gate of the constant current element 6a.

The rectifying element 22 is, for example, a diode and is connected between the source of the constant current element 6a and the low-potential terminal 9b of the rectifying circuit 9 so as to allow a current to flow from the low-potential terminal 9b to the constant current element 6a as a forward biased direction.

The other end of the inductor 23 is connected to a high-potential output terminal 30, and the low-potential terminal 9b of the rectifying circuit 9 is connected to a low-potential output terminal 31. The output capacitor 28 is connected between the high-potential output terminal 30 and the low-potential output terminal 31.

The lighting load 2 is connected between the high-potential output terminal 30 and the low-potential output terminal 31 in parallel to the output capacitor 28.

The reference voltage generating circuit 41 includes a latch circuit 42, transistors 44 and 50, capacitors 45, 54, and 59, resistances 46 to 49, 51 to 53, 56, and 57, a operating amplifying circuit 55 and a Zener diode 58.

The latch circuit 42 is a SR latch circuit, and a set terminal S is connected to the high-potential terminal 9a of the rectifying circuit 9 via the resistance 48, and is connected to the low-potential terminal 9b of the rectifying circuit 9 via the resistance 49.

The transistor 44 is an NPN transistor, and a collector is connected to the set terminal S of the latch circuit 42 and an emitter is connected to the low-potential terminal 9b of the rectifying circuit 9. A base of the transistor 44 is connected to the high-potential terminal 9a of the rectifying circuit 9 via the resistance 47, and is connected to the low-potential terminal 9b of the rectifying circuit 9 via the capacitor 45 and the resistance 46. The resistance 47 and the capacitor 45 constitute a low pas filter or an integrating circuit which smooth the DC voltage VRE output from the rectifying circuit 9.

The transistor 50 is the NPN transistor, and a collector is connected to a reset terminal R– of the latch circuit 42 and an emitter is connected to the low-potential terminal 9b of the rectifying circuit 9. A base of the transistor 50 is connected to one end of the resistance 51 connected to the smoothing capacitor 40 via a base resistance, and the emitter of the transistor 50 is connected to the other end of the resistance 51. A base-emitter resistance is connected between the base and emitter of the transistor 50, and the transistor 50 is turned ON and OFF in accordance with the voltage of the resistance 51.

The set terminal S of the latch circuit 42 is positive logic. In other words, when a voltage obtained by dividing the voltage VRE output from the rectifying circuit 9 by the resistances 48 and 49 when the transistor 44 is OFF is equal to or higher than the threshold value voltage of the latch circuit 42, the latch circuit 42 is set and outputs high level, that is, logical value true ("1") to an output terminal Q. Also, the reset terminal R– of the latch circuit 42 is negative logic and is reset when the transistor 50 is ON and the latch circuit 42 outputs low level, that is, logical value false ("0"). The latch circuit 42 is reset as an initial state.

The operational amplifier 55 constitutes a voltage follower circuit. A non-inverting input terminal (+) of the operational amplifier 55 is connected to the output terminal Q of the latch circuit 42 via the resistance 52, and an inverting input terminal (−) of the operational amplifier 55 is connected to an output terminal of the operational amplifier 55. The non-inverting input, terminal (−) of the operational amplifier 55 is connected to the low-potential terminal 9b of the rectifying circuit 9 via the resistance 53 and the capacitor 54. The resistance 52 and the capacitor 54 constitute a low pas filter or an integrating circuit which smoothes the voltage output from the output terminal Q of the latch circuit 42.

The voltage of the smoothing capacitor 40 charges the capacitor 59 via the resistance 57 and the output voltage of the operational amplifier 55 charges the capacitor 59 via the resistance 56, respectively. The voltage of the capacitor 59 is supplied to the resistance 27 of the DC-DC converter 11 as the reference voltage VREF via the Zener diode 58.

Subsequently, the operation of the lighting power source 3 will be described.

The dimmer 8 outputs the AC voltage VCT which varies in timing of conduction, that is, phase at which the voltage is increased in accordance with the dimming degree as described above. The AC voltage VCT is increased at a phase 0 degree when the dimming degree is 100% to have substantially the same level as the input power voltage VIN. When the dimming degree is reduced from 100%, the AC voltage VCT delays in phase of rising and, when the dimming degree is 0%, delays 180 degrees, that is, becomes approximately 0V. The dimming degree is a ratio of the output current IOUT with respect to the maximum current value, and is not proportional to the phase at which the AC voltage VCT is increased.

The rectifying circuit 9 outputs the DC voltage (pulsed flow voltage) VRE which is obtained by rectifying the AC voltage VCT output from the dimmer 8. Therefore, the DC voltage VRE output from the rectifying circuit 9 is a voltage varying in value with time and varying in average value in accordance with the dimming degree.

When an instantaneous value of the DC voltage VRE input to the power factor control circuit 10 is relatively low, the current value flowing through the choke coil 20 is small, the current value flowing through the resistance 18 is also small, and the voltage induced in the drive winding 38 magnetically coupled to the choke coil 20 is low. Consequently, the switching element 17 configured to receive a supply of the induced voltage from the drive winding 38 to a gate thereof is still in the ON state, and the switching element 17 allows a constant DC current from the dimmer 8 to flow via the choke coil 20 and the rectifying circuit 9.

In contrast, when the instantaneous value of the DC voltage VRE input to the power factor control circuit 10 is relatively high, the current flowing through the choke coil 20 is increased, and the current flowing through the resistance 18 is increased, and the source potential of the switching element 17 is increased. A negative voltage exceeding a threshold voltage is generated between the gate and source of the switching element 17. Consequently, the switching element 17 is turned OFF and the current flowing through the choke coil 20 flows through the diode 21 and charges the smoothing capacitor 40. At this time, the current flowing through the choke coil 20 is reduced. When the current flowing through the choke coil 20 becomes zero, the switching element 17 is turned ON. Consequently, a state in which the current flowing through the choke coil 20 is increased is restored, and the same operation is repeated from then onward. The switching element 17 repeats the ON state and the OFF state to perform a switching operation and oscillate.

Therefore, the switching element 17 flows an oscillation current from the dimmer 8 via the choke coil 20 and the rectifying circuit 9, and charges the smoothing capacitor 40 with the oscillation current via the diode 21. The switching element 17 is a normally-on type element and is turned ON when the voltage induced by the drive winding 38 is lowered. Therefore, the current flows through the choke coil 20 continuously. Consequently, the current may be flowed continuously to the dimmer 8 via the rectifying circuit 9.

In this manner, the power factor control circuit 10 performs the switching operation which repeats the ON state and the OFF state and oscillates to flow the oscillation current to the choke coil 20 when the instantaneous value of the DC voltage VRE output from the rectifying circuit 9 is relatively high, that is, equal to or higher than a third voltage, and continues the ON state when the instantaneous value of the DC voltage VRE output from the rectifying circuit 9 is relatively low, that is, lower than the third voltage to flow the DC current to the choke coil 20. The current continuously flows to the dimmer 8 via the rectifying circuit 9.

Therefore, by connecting the power factor control circuit 10 as a load of the rectifying circuit 9, an influence of an input impedance of the DC-DC converter 11 on the downstream side is inhibited and the dimmer 8 may be brought into a stable operation.

In addition, since the average value of the current waveform flowing through the choke coil 20 may be brought to be close to an AC voltage waveform in comparison with a case where the power factor control circuit 10 is not provided and the rectifying circuit 9 and the smoothing capacitor 40 are directly connected, the power factor is improved.

Subsequently, the operation of the reference voltage generating circuit 41 will be described.

When the DC voltage (pulsed voltage) VRE of the rectifying circuit 9 until the dimmer 8 is brought into conduction is relatively low, the voltage obtained by dividing the DC voltage VRE by the resistances 48 and 49 is low level. Consequently, the latch circuit 42 is reset. The voltage obtained by dividing the DC voltage VRE by the resistances 46 and 47 is low level and the transistor 44 is turned OFF.

When the dimmer 8 is brought into conduction, the DC voltage VRE of the rectifying circuit 9 is increased, the voltage obtained by dividing the DC voltage VRE by the resistances 48 and 49 becomes high level. The high level is input to the set terminal S of the latch circuit 42, and the latch circuit 42 is set. The latch circuit 42 outputs high level.

In accordance with the time constant defined by the resistance 47 and the capacitor 45, the voltage of the capacitor 45 is increased, and the transistor 44 is turned ON. Consequently, low level is input to the set terminal S of the latch circuit 42.

In this manner, a pulse signal indicating that a rising edge varied in accordance with the dimming degree of the DC voltage VRE is input to the set terminal S of the latch circuit 42. The pulse signal is a signal which becomes high level only for a short time when the DC voltage VRE of the rectifying circuit 9 is increased.

The latch circuit 42 is reset when a charging current flows through the smoothing capacitor 40 and the transistor 50 is turned ON. The latch circuit 42 outputs low level.

Therefore, the latch circuit 42 outputs a pulse signal of a high level (active) for a period from the detection of rising of the DC voltage VRE until the smoothing capacitor 40 is charged. The period during which the pulse signal rises to high level corresponds to a dimming phase angle of the dimmer 8, and the pulse signal is used as a dimming signal CTL corresponding to the dimming degree of the dimmer 8.

The integrating circuit including the resistance 52 and the capacitor 54 integrates and smoothes the dimming signal CTL output from the latch circuit 42. Then, the smoothed voltage is output to the resistance 56 via the voltage follower circuit including the operational amplifier 55, and is further added to the voltage of the smoothing capacitor 40 input via the resistance 57.

The voltage obtained by adding the dimming signal CTL and the voltage of the smoothing capacitor 40 is shifted in level by the Zener diode 58, and is output to the DC-DC converter 11 as the reference voltage VREF. The DC-DC converter 11 is controlled by the reference voltage VREF.

In this manner, since the reference voltage generating circuit 41 generates the dimming signal CTL from the DC voltage VRE output from the rectifying circuit 9 and then generates the reference voltage VREF by further adding the voltage of the smoothing capacitor 40. Therefore, the reference voltage VREF whose value varies in accordance with the dimming degree of the dimmer 8 is generated.

When the rising of the DC voltage VRE output from the rectifying circuit 9 and the timing when the charging current flows to the smoothing capacitor 40 match, the latch circuit 42 outputs low level. At this time, the reference voltage VREF is defined by the voltage of the smoothing capacitor 40.

Subsequently, the operation of the DC-DC converter 11 will be described.

The operation of the DC-DC converter 11 when the dimming degree of the dimmer 8 is set to almost 100% and the input AC voltage is transmitted substantially without change will be described first.

At this time, the smoothing capacitor 40 is charged to the highest voltage by the power factor control circuit 10, and the highest DC voltage is input to the DC-DC converter 11. The reference voltage generating circuit 41 outputs the highest reference voltage VREF.

When the power voltage VIN is supplied to the lighting power source 3, the output element 5a and the constant current element 6a, being the normally-on type elements, are both in the ON state. Then, a current flows through a route of the output element 5a, the constant current element 6a, the inductor 23, and the output capacitor 28, and the output capacitor 28 is charged. Voltages at both ends of the output capacitor 28, that is, the voltage between the high-potential output terminal 30 and the low-potential output terminal 31 is supplied to the lighting source 4 of the lighting load 2 as the output voltage VOUT from the lighting power source 3a. Since the output element 5a and the constant current element 6a are turned ON, an inverted voltage is applied to the rectifying element 22. No current flows to the rectifying element 22.

When the output voltage VOUT reaches the predetermined voltage, the output current IOUT flows to the lighting source 4, and the lighting source 4 is turned ON. At this time, a current flows through a route of the output element 5a, the constant current element 6a, the inductor 23, the output capacitor 28 and the lighting source 4. For example, when the lighting source 4 is the LED, the predetermined voltage is a forward voltage of the LED, and is defined in accordance with the lighting source 4. Since the output current IOUT does not flow when the lighting source 4 is turned OFF, the output capacitor 28 maintains the value of the output voltage VOUT.

Since the DC voltage input to the DC-DC converter 11 is sufficiently high in comparison with the output voltage VOUT, that is, a potential difference ΔV between the input and the output is sufficiently high, the current flowing through the inductor 23 is increased. Since the feedback winding 24 is magnetically coupled to the inductor 23, an electromotive force of a polarity having a higher potential on the coupling capacitor 25 side is induced in the feedback winding 24. Therefore, a positive potential with respect to the source is supplied to the gate of the output element 5a via the coupling capacitor 25, and the output element 5a maintains the ON state.

When the current flowing through the constant current element 6a including the FET exceeds the upper limit value, the voltage between the drain and source of the constant current element 6a is abruptly increased. Therefore, the voltage between the gate and source of the output element 5a becomes lower than the threshold voltage, and the output element 5a is turned OFF. The upper limit value is a saturated current value of the constant current element 6a, and is defined by the reference voltage VREF and the potential input from the dividing resistances 26 and 27 to the gate of the constant current element 6a. As described above, since the reference voltage VREF having the highest value is supplied to the gate of the constant current element 6a via the resistance 27, the saturated current value is set to the maximum value.

The inductor 23 continuously allows the current to flow through the route of the rectifying element 22, the output capacitor 28 and the lighting load 2, and the inductor 23. At this time, the inductor 23 discharges energy, so that the current of the inductor 23 is gradually reduced. Therefore, an electromotive force of a polarity having a lower potential on the coupling capacitor 25 side is induced in the feedback winding 24. A negative potential with respect to the source is supplied to the gate of the output element 5a via the coupling capacitor 25, and the output element 5a continues the OFF state.

When the energy accumulated in the inductor 23 becomes zero, the current flowing in the inductor 23 becomes zero. The direction of the electromotive force induced by the feedback winding 24 is reversed again, and an electromotive force of a higher potential on the coupling capacitor 25 side is induced. Accordingly, a potential higher than the source is supplied to the gate of the output element 5a, and the output element 5a is turned ON.

From then onward, the above-described operation is repeated. Accordingly, switching of the output element 5a to ON and OFF is automatically repeated, and the output element 5a performs the switching operation, so that the output voltage VOUT reduced in power voltage VIN is supplied to the lighting source 4. The current supplied to the lighting source 4 is a constant current whose upper limit value is limited by the constant current element 6a. Therefore, stable lighting of the lighting source 4 is ensured. Since the saturated current value of the constant current element 6a is set to the maximum value as described above, the upper limit value is the largest, and the average value of the current supplied to the lighting source 4 becomes the maximum value. Therefore, lighting source 4 is dimmed to provide the maximum light output corresponding to 100% of the dimming degree of the dimmer 8.

The same as described above applies if the switching operation in which the output, element 5a repeats the ON state and the OFF state may be continued even when the dimming degree of the dimmer 8 is set to a value lower than 100% and an AC voltage to be input is controlled in phase and transmitted, that is, even when a relatively high DC voltage is input to the DC-DC converter 11 as well. The value of the DC voltage and the reference voltage VREF input to the DC-DC converter 11 varies in accordance with the dimming degree of the dimmer 8, and an average value of the output current TOUT may be controlled. Therefore, according to the dimming degree, the lighting source 4 of the lighting load 2 may be dimmed.

When the dimming degree of the dimmer 8 is set to a further lower value, that is, when the DC voltage and the reference voltage VREF to be input to the DC-DC converter 11 are relatively low, that is, when the reference voltage is lower than a first voltage, the current flowing through the constant current element 6a does not reach the upper limit value, and the output element 5a is not turned OFF. Therefore, the output element 5a continues to be in the ON state, and hence the current value vibrates, so that the average value of the output current IOUT from the DC-DC converter 11 is lowered.

When the dimming degree of the dimmer 8 is set to a still lower value, and the DC voltage and the reference voltage VREF to be input to the DC-DC converter 11 are further lowered, that is, the DC voltage and the reference voltage VREF are equal to or lower than a second voltage which is lower than the first voltage, the output element 5a continues the ON state, and the state of constant current value is achieved. The output element 5a outputs a constant DC current controlled by the constant current value of the constant current element 6a.

FIGS. 4A to 4D are waveform charts illustrating current waveforms of the output element.

Waveforms of a current I5 of the output element 5a in a case where the dimming degree increases in the order of FIGS. 4A to 4D, and the potential difference $\Delta V$ between the voltage of the smoothing capacitor 40 and the output voltage VOUT and the reference voltage VREF increase are schematically illustrated.

Figure 4A:
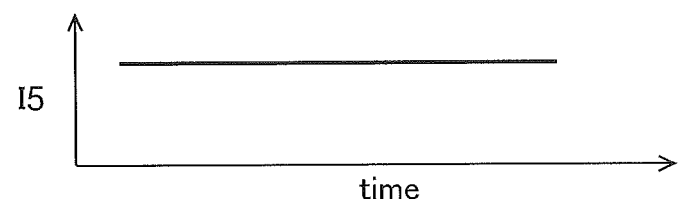
FIGS. 4A to 4D are waveform charts illustrating current waveforms of output elements.

As illustrated in FIG. 4A, when the potential difference $\Delta V$ and the reference voltage VREF are relatively small (equal to or smaller than the second voltage lower than the first voltage), the output element 5a continues to be in the ON state. A substantially constant DC current limited by the constant current element 6a flows through the output element 5a. The value of the DC current is defined by the reference voltage VREF. In this manner, in the state in which the output element 5a outputs the constant DC current, the DC-DC converter 11 performs an operation like a series regulator.

Figure 4B:
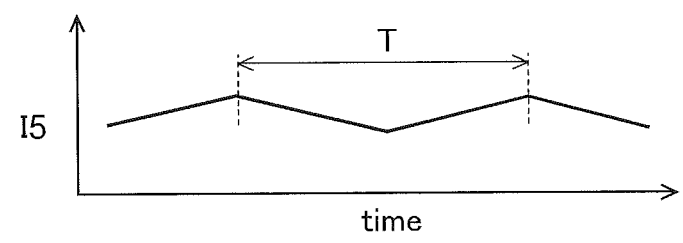
Figure 4C:
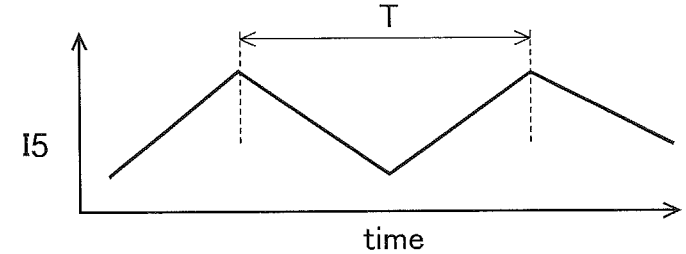

As illustrated in FIG. 4B, when the potential difference $\Delta V$ and the reference voltage VREF increase (higher than the second voltage and lower than the first voltage), the current of the output element 5a vibrates while continuing to be in the ON state. As illustrated in FIG. 4C, when the potential difference $\Delta V$ and the reference voltage VREF further increase, a variation range of the current of the output element 5a is increased in accordance with the potential difference $\Delta V$ and the reference voltage VREF.

A vibration frequency T of the current of the output element 5a varies in accordance with the variation range of the current.

In this manner, in the state in which the current vibrates while the output element 5a continued to be in the ON state, the DC-DC converter 11 performs a transient operation between the operation of the series regulator and the operation of the switching power source.

Figure 4D:
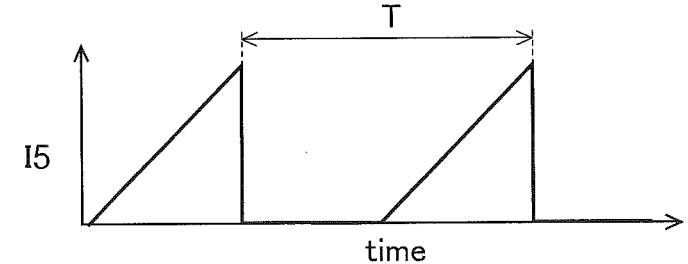

Then as illustrated in FIG. 4D, when the potential difference $\Delta V$ and the reference voltage VREF are equal to or larger than the predetermined value (first voltage), the output element 5a performs the switching operation which repeats the ON state and the OFF state and oscillates. At this time, the lighting power source 3 is operated as the switching power source.

In this manner, in the first embodiment, when the potential difference $\Delta V$ and the reference voltage VREF are equal to or higher than the predetermined value, the output element 5a performs the switching operation, and when the potential difference $\Delta V$ and the reference voltage VREF are lowered to levels lower than the predetermined value, the output element 5a continues to be in the ON state and operates as a series regulator after performing the transient operation to vibrate the current value. When the potential difference $\Delta V$ is large, the product of the current and voltage of the output element 5a is increase and hence the loss is increased. However, since the switching operation is performed in the first embodiment, the loss may be reduced. When the potential difference $\Delta V$ is small, the loss in the output element 5a is small, and hence the operation as the series regulator may be performed without problem.

In the first embodiment, since the reference voltage VREF varies in accordance with the dimming degree of the dimmer 8, the DC-DC converter 11 may be continuously transferred from the switching operation to the operation as the series regulator via the transient operation in accordance with the dimming degree. Consequently, in this embodiment, the output current may be varied continuously. Also, smooth transfer to extinguishment is achieved by dimming the lighting load 2 in the luminaire 1.

FIGS. 5A to 5H are waveform charts illustrating principal signals of the lighting power source.

In FIG. 5, measured values of the DC voltage VRE of the rectifying circuit 9, the output current IOUT from the lighting power source 3, and a voltage VD of the rectifying element 22 when the dimming degree of the dimmer 8 is increased in the order of FIGS. 5A to 5H are illustrated.

As illustrated in FIG. 5A, when the dimming degree is 0%, that is, when the dimming phase angle is 180 degrees, since the DC voltage VRE of the rectifying circuit 9 is zero in overall phase, the output current IOUT does not flow.

When the dimming degree is increased, that is, when a dimming phase angle is reduced as illustrated in FIGS. 5B to 5H, the output voltage from the rectifying circuit 9 is increased, the current of the output element 5a vibrates, and the vibration current I5 flows through the output element 5a. The output element 5a continuously transfers between the state of continuing to be in the ON state and vibrating without being switched to the OFF state and an oscillating state in which the switching operation to repeat the ON state and the OFF state is performed in accordance with the dimming degree. Consequently, the amplitude of the voltage VD of the rectifying element 22 varies continuously in accordance with the dimming degree and the output current IOUT varies continuously in accordance with the dimming degree.

Figure 6:
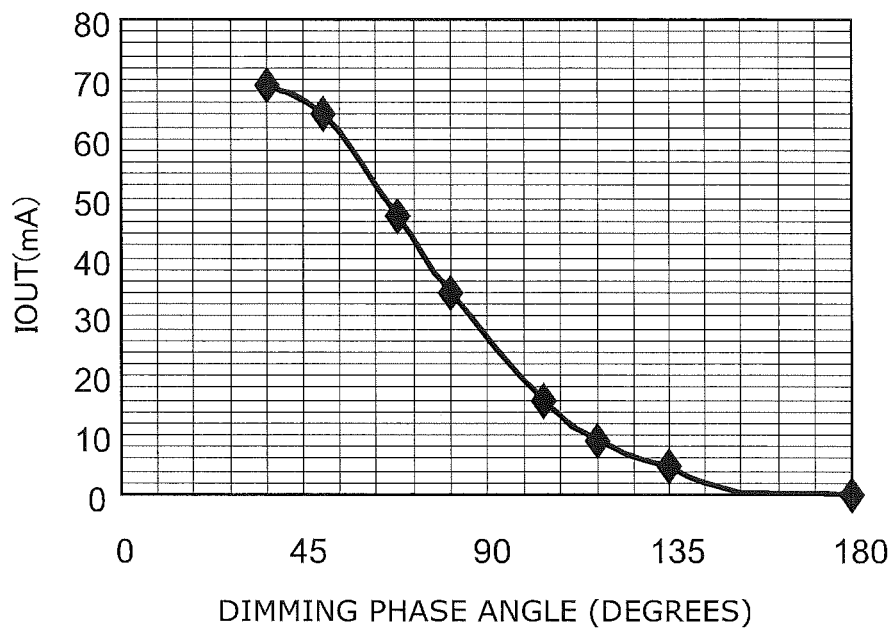
FIG. 6 is a characteristic drawing illustrating a relationship between a dimming phase angle and the output current IOUT.

FIG. 6 is a characteristic drawing illustrating a relationship between the dimming phase angle and the output current IOUT.

As illustrated in FIG. 6, in the detailed example, the output current IOUT may be controlled continuously to zero in accordance with the dimming phase angle (dimming degree).

Subsequently, the effect of the first embodiment will be described.

In first embodiment, the DC-DC converter 11 is controlled by the reference voltage VREF which varies in accordance with the dimming degree of the dimmer. Therefore, the output element outputs an output current by transferring continuously between the state of the switching operation in which the ON state and the OFF state are repeated and the state of continuing to be in the ON state via the state in which the current vibrates while continuing to be in the ON state in accordance with the dimming degree. Consequently, the output current is varied continuously. Also, the continuous dimming of the luminaire may be achieved, and hence the smooth extinguishment is enabled.

Figure 7:
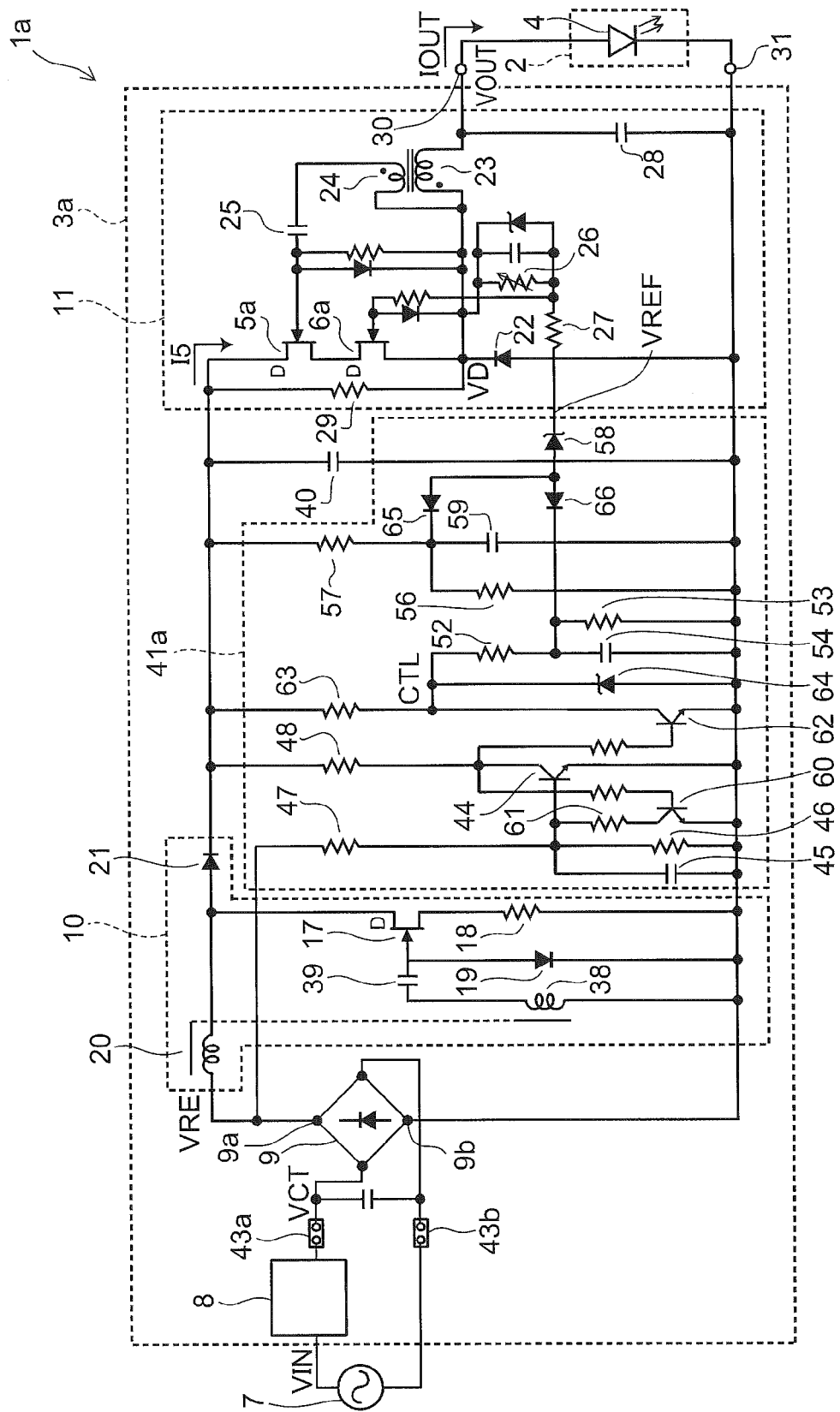
FIG. 7 is a circuit diagram illustrating a luminaire including a lighting power source according to a second embodiment.

FIG. 7 is a circuit diagram illustrating the luminaire including a lighting power source according to a second embodiment.

As illustrated in FIG. 7, the second embodiment is different from the first embodiment in the configuration of the reference voltage generating circuit 41. In other words, a lighting power source 3a includes the dimmer 8, the rectifying circuit 9, the power factor control circuit 10, the DC-DC converter 11, and a reference voltage generating circuit 41a. The dimmer 8, the rectifying circuit 9, the power factor control circuit 10, and the DC-DC converter 11 are the same as those in the first embodiment. A luminaire 1a includes the lighting load 2 and the lighting power source 3a. The lighting load 2 is the same as that in the first embodiment.

The reference voltage generating circuit 41a is different from the reference voltage generating circuit 41 in the configuration of generating the dimming signal CTL and in that the reference voltage VREF is generated while assigning the highest priority to the lower voltage between the voltages generated respectively from the dimming signal CTL and the smoothing capacitor 40.

The reference voltage generating circuit 41a includes the transistors 44, 60, and 62, the resistances 46 to 48, 52, 53, 56, 57, 61, and 63, the capacitors 45, 54, and 59, the Zener diodes 58 and 64, and the diodes 65 and 66.

The transistor 44 is the NPN transistor, and a collector is connected to the cathode of the diode 21 of the power factor control circuit 10 via the resistance 48. The emitter of the transistor 44 is connected to the low-potential terminal 9b of the rectifying circuit 9. The collector of the transistor 44 receives a supply of the voltage of the smoothing capacitor 40 via the resistance 48. The base of the transistor 44 is connected to the high-potential terminal 9a of the rectifying circuit 9 via the resistance 47, and is connected to the low-potential terminal 9b of the rectifying circuit 9 via the resistance 46. The capacitor 45 is connected between the base of the transistor 44 and the low-potential terminal 9b of the rectifying circuit 9. The capacitor 45 is a capacitor for eliminating a noise, and the time constant defined by the capacitor 45 and the resistance 46 and 47 is set to a value sufficiently smaller than the frequency of the power voltage VIN.

The transistor 60 is the NPN transistor, and a collector is connected to the base of the transistor 44 via the resistance 61. An emitter of the transistor 60 is connected to the low-potential terminal 9b of the rectifying circuit 9. A base of the transistor 60 is connected to the collector of the transistor 44 via the resistance.

The base of the transistor 62 is connected to the collector of the transistor 44 via the resistance, and the emitter of the transistor 62 is connected to the low-potential terminal 9b of the rectifying circuit 9. A collector of the transistor 62 is connected to the cathode of the diode 21 of the power factor control circuit 10 via the resistance 63. The collector of the transistor 62 receives a supply of the voltage of the smoothing capacitor 40 via the resistance 63. The Zener diode 64 is connected between the collector and emitter of the transistor 62.

The integrating circuit including the resistance 52 and the capacitor 54 is connected between the collector and the emitter of the transistor 62. The resistance 53 is connected to both ends of the capacitor 54. The voltage of the capacitor 54 is input to the Zener diode 58 via the diode 66.

An integrating circuit including the resistance 57 and the capacitor 59 is connected to both ends of the smoothing capacitor 40. The resistance 56 is connected in parallel to capacitor 59. The voltage of the capacitor 59 is input to the Zener diode 58 via the diode 65.

The Zener diode 58 outputs the reference voltage VREF to the resistance 27 of the DC-DC converter 11.

Subsequently, the operation of the reference voltage generating circuit 41a will be described.

When the DC voltage (pulsed voltage) VRE of the rectifying circuit 9 until the dimmer 8 is brought into conduction is relatively low, the voltage obtained by dividing the DC voltage VRE by the resistances 46 and 47 is low level. Consequently, the transistor 44 is turned OFF and the collector voltage of the transistor 44 is high level. The transistors 60 and 62 are turned ON. Since the transistor 60 is ON, the resistance 61 is connected in parallel to the resistance 46, and a base voltage of the transistor 44 is lower than a case where the resistance 61 is not connected.

Since the transistor 62 is ON, the transistor 62 outputs low level as the dimming signal CTL. The dimming signal CTL is smoothed via the low pass filter including the resistances 52 and 53 and the capacitor 54 or the integrating circuit, and is input to the diode 66. The voltage of the smoothing capacitor 40 smoothed by the resistance 57 and the capacitor 59 is input to the diode 65. Since the dimming signal CTL is low level, the diodes 65 and 66 select the dimming signal CTL having a lower voltage from the voltage of the smoothing capacitor 40 and the smoothed voltage of the dimming signal CTL, and output the selected dimming signal CTL to the DC-DC converter 11 as the reference voltage VREF via the Zener diode 58.

When the dimmer 8 is brought into conduction, the DC voltage VRE of the rectifying circuit 9 is increased, the voltage obtained by dividing the DC voltage VRE by the resistance 47, and the resistances 46 and 61 becomes high level. Consequently, the transistor 44 is turned ON and the collector voltage of the transistor 44 becomes low level. The transistors 60 and 62 are turned OFF. Since the transistor 60 is OFF, the resistance 61 is disconnected from the resistance 46. The base voltage of the transistor 44 is increased in comparison with a state when the resistance 61 is connected, and the DC voltage VRE is increased to a voltage divided by the resistances 46 and 47. Therefore, such a phenomenon that the base voltage of the transistor 44 varies by a noise or the like and the transistor 44 is erroneously turned OFF may be avoided. In other words, hystereses are provided on the voltage to turn ON the transistor 44 and the voltage to turn OFF the transistor 44, respectively.

Since the transistor 62 is OFF, a collector voltage of the transistor 62 is brought into a Zener voltage of the Zener diode 64, and is stabilized. A collector voltage of the transistor 62 is input to the diode 66 via the integrating circuit including the resistance 52 and the capacitor 54 as the dimming signal CTL. The dimming signal CTL is kept at a voltage stabilized by the Zener diode 64 until the DC voltage VRE of the rectifying circuit 9 is lowered and the transistor 44 is turned OFF, that is, to a point in the vicinity where the DC voltage VRE crosses zero.

The voltage of the smoothing capacitor 40 is input to the diode 65 via the integrating circuit including the resistance 57 and the capacitor 59. Therefore, the Zener diode 58 shifts the level of the lower one of the voltage obtained by smoothing the voltage of the smoothing capacitor 40 and the voltage obtained by smoothing the dimming signal CTL, and outputs the voltage at the shifted level as the reference voltage VREF.

In the second embodiment, since the priority is assigned to a lower value from between the voltage of the smoothing capacitor 40 and the dimming signal CTL, response when the smoothed voltage is lowered by dimming may be quickened.

For example, the time constant of the integrating circuit including the resistance 57 and the capacitor 59 achieves quicker response with respect to the variation in dimming degree by setting the time constant to be a value smaller than the time constant of the integrating circuit including the resistance 52 and the capacitor 54.

In the second embodiment as well, the DC-DC converter is controlled by the reference voltage VREF. Therefore, the same effect as the first embodiment may be obtained.

Although the embodiments have been described with reference to the detailed examples, the configurations are not limited to the embodiments, and various modifications are applicable.

For example, the lighting power source and the luminaire may not include the dimmer 8. In FIG. 1 and FIGS. 5A to 5H, the rectifying circuit 9 is connected to the dimmer 8 via a connecting portion 43a, and connected to the AC power source 7 via a connecting portion 43b. However, a configuration in which the connecting portions 43a and 43b are connected to the AC power source 7 and the dimmer 8 is not included is also applicable. Alternatively, a structure in which the dimmer 8 is provided separately and the connecting portions 43a and 43b are configured to have the same structure as an input unit of the AC power source of the dimmer 8 in the case of including the dimmer 8 is also applicable. In this case, the lighting power source and the luminaire may be connected to the AC power source 7 with or without the intermediary of the dimmer 8.

In FIG. 7, the dimming signal CTL is generated by the transistors 44 and 60. However, a configuration in which the dimming signal CTL is generated by using the latch circuit 42, the transistors 44 and 50 or the like as in FIG. 1, and the priority is assigned to one of the voltage obtained by smoothing the dimming signal CTL and the voltage obtained by smoothing the voltage of the smoothing capacitor 40 which is lower is also applicable.

The output element 5a and the constant current element 6a are not limited to GaN system HEMT. For example, a semiconductor element formed by using a semiconductor (wide band gap semiconductor) having a wide band gap such as Silicon Carbide (SiC), Gallium nitride (GaN), or diamond on a semiconductor substrate is also applicable. Here, the wide band gap semiconductor means a semiconductor having a wider band gap than gallium arsenide (GaAs) having a band gap of approximately 1.4 eV. Included are, for example, a semiconductor having a band gap of 1.5 eV or larger, gallium phosphide (GaP a band gap of approximately 2.3 eV), gallium nitride (GaN, a band gap of approximately 3.4 eV), diamond (C, a band gap of approximately 5.27 eV), aluminum nitride (AlN, a band bap of approximately 5.9 eV), and silicon carbide (SiC). When equalization of the pressure resistances is wanted, such a wide band gap semiconductor element achieves a shorter switching frequency, and hence achieves downsizing of winding components or capacitors since a parasitic capacitance is small because the size may be reduced in comparison with a silicon semiconductor element and hence the high-speed operation is enabled.

The lighting source 4 is not limited to the LED, and an EL or an OLED are also applicable. A plurality of the lighting sources 4 may be connected in series or in parallel to the lighting load 2.

Although several embodiments and the examples of the invention have been described, these embodiments or the examples are presented as examples and are not intended to limit the scope of the invention. These novel embodiments or the examples may be implemented in other various modes, and various omissions, replacements, and modifications may be made without departing the scope of the invention. The embodiments or examples and the modifications thereof are included in the scope and gist of the invention as well as the invention described in the appended claims and equivalents thereof.

What is claimed is:
1. A lighting power source comprising:
a rectifying circuit configured to rectify an input AC voltage;
a smoothing capacitor configured to smooth an output voltage from the rectifying circuit;
a reference voltage generating circuit configured to generate a reference voltage on the basis of at least any one of the output voltage from the rectifying circuit and a voltage of the smoothing capacitor; and
a DC-DC converter configured to convert the voltage of the smoothing capacitor and including: an output element configured to receive a supply of a voltage of the smoothing capacitor, oscillate by performing a switching operation which repeats an ON state and an OFF state when the reference voltage is relatively high and continue to be in the ON state when the reference voltage is relatively low; and a constant current element con- nected to the output element in series and configured to flow a constant current controlled by the reference voltage.

2. The lighting power source according to claim 1, wherein the reference voltage generating circuit is configured to
generate the reference voltage on the basis of a voltage obtained by combining the output voltage from the rectifying circuit and the voltage of the smoothing capacitor during a period from when the output voltage from the rectifying circuit increased to a level equal to or higher than a prescribed value until a charging current flows to the smoothing capacitor, and
generate the reference voltage on the basis of the voltage of the smoothing capacitor during a period from when the charging current flows until the output voltage of the rectifying circuit is lowered to a level equal to or lower than the prescribed value.

3. The lighting power source according to claim 1, wherein the reference voltage generating circuit generates the reference voltage by smoothing the output voltage from the rectifying circuit at a time constant longer than the voltage of the smoothing capacitor.

4. The lighting power source according to claim 1, wherein the reference voltage generating circuit generates the reference voltage on the basis of a lower voltage of a voltage generated on the basis of the output voltage from the rectifying circuit and a voltage generated on the basis of the output voltage of the smoothing capacitor.

5. The lighting power source according to claim 1, wherein the output element vibrates so that a variation range of the current flowing to the output element is increased when the reference voltage is increased.

6. The lighting power source according to claim 1, wherein the output element outputs a DC current by continuing to be in the ON state when the reference voltage is relatively low.

7. The lighting power source according to claim 1, further comprising a dimmer configured to control a timing for conducting the AC voltage and dim light.

8. The lighting power source according to claim 1, wherein the reference voltage generating circuit generates a dimming signal which becomes active during a period from when the output voltage from the rectifying circuit is increased to a level equal to or higher than a prescribed value until a charging current flows to the smoothing capacitor.

9. The lighting power source according to claim 8, wherein a potential of the dimming signal is stabilized in comparison with the voltage from the smoothing capacitor.

10. The lighting power source according to claim 1, wherein the reference voltage generating circuit includes a latch circuit configured to be set when the output voltage of the rectifying circuit is increased to a level equal to or higher than a prescribed value and to be reset when a charging current flows to the smoothing capacitor.

11. The lighting power source according to claim 1 wherein the reference voltage generating circuit includes a transistor configured to be turned ON when the output voltage from the rectifying circuit is increased to a level equal to or higher than a prescribed value and to be turned OFF when the AC voltage crosses zero.

12. The lighting power source according to claim 11, wherein the voltage at which the transistor is turned ON and the voltage at which the transistor is turned OFF are provided with hystereses.

13. The lighting power source according to claim 1, further comprising a power factor control circuit connected between the rectifying circuit and the smoothing capacitor and allows a current to flow therethrough when the output voltage from the rectifying circuit is smaller than a prescribed value.

14. The lighting power source according to claim 13, wherein the power factor control circuit includes:
a choke coil;
a switching element connected to an output of the rectifying circuit via the choke coil; and
a diode connected between the choke coil and the smoothing capacitor.

15. A luminaire comprising:
a lighting load; and
a lighting power source configured to supply a current to the lighting load and including:
a rectifying circuit configured to rectify an input AC voltage;
a smoothing capacitor configured to smooth an output voltage from the rectifying circuit;
a reference voltage generating circuit configured to generate a reference voltage on the basis of at least any one of the output voltage from the rectifying circuit and a voltage of the smoothing capacitor; and
a DC-DC convert or configured to convert the voltage of the smoothing capacitor and including:
an output element configured to receive a supply of a voltage of the smoothing capacitor, oscillate by performing a switching operation which repeats an ON state and an OFF state when the reference voltage is relatively high, and continue to be in the ON state when the reference voltage is relatively low; and
a constant current element connected to the output element in series and configured to flow a constant current controlled by the reference voltage.

16. The luminaire according to claim 15, wherein the reference voltage generating circuit is configured to
generate the reference voltage on the basis of a voltage obtained by combining the output voltage of the rectifying circuit and the voltage from the smoothing capacitor during a period from when the output voltage from the rectifying circuit increased to a level equal to or higher than a prescribed value until a charging current flows to the smoothing capacitor, and
generate the reference voltage on the basis of the voltage of the smoothing capacitor during a period from when the charging current flows until the output voltage of the rectifying circuit is lowered to a level equal to or lower than the prescribed value.

17. The luminaire according to claim 15, wherein the reference voltage generating circuit generates the reference voltage on the basis of a lower voltage of a voltage generated on the basis of the output voltage from the rectifying circuit and a voltage generated on the basis of the output voltage of the smoothing capacitor.

18. The luminaire according to claim 17, wherein the reference voltage generating circuit generates the reference voltage by smoothing the output voltage from the rectifying circuit at a relatively long time constant and smoothing the voltage of the smoothing capacitor at a relatively short time constant.

19. The luminaire according to claim 15, wherein the output element vibrates so that a variation range of the current flowing to the output element is increased when the reference voltage is increased.

20. The luminaire according to claim 15, wherein the output element outputs a DC current by continuing to be in the ON state when the reference voltage is relatively low.

* * * * *